(12) United States Patent
Koren

(10) Patent No.: US 12,311,449 B2
(45) Date of Patent: May 27, 2025

(54) METHOD FOR CUTTING A THREAD ON A ROTATING WORKPIECE

(71) Applicant: ISCAR, LTD., Tefen (IL)

(72) Inventor: Vladimir Koren, Maalot (IL)

(73) Assignee: Iscar, Ltd., Tefen (IL)

( * ) Notice: Subject to any disclaimer, the term of this patent is extended or adjusted under 35 U.S.C. 154(b) by 682 days.

(21) Appl. No.: 17/708,208

(22) Filed: Mar. 30, 2022

(65) Prior Publication Data

US 2023/0311224 A1 Oct. 5, 2023

(51) Int. Cl.
*B23B 5/46* (2006.01)
*B23B 27/06* (2006.01)
*B23Q 15/013* (2006.01)

(52) U.S. Cl.
CPC .............. *B23B 5/46* (2013.01); *B23B 27/065* (2013.01); *B23Q 15/013* (2013.01)

(58) Field of Classification Search
CPC .. B23B 1/00; B23B 5/46; B23B 25/02; B23B 29/125; B23B 7/00; B23Q 5/50; B23Q 15/0075; B23Q 15/013; B23Q 15/14; B23G 3/00; B23G 1/04; B23G 2240/36; Y10T 82/20; Y10T 82/904
See application file for complete search history.

(56) References Cited

U.S. PATENT DOCUMENTS

| | | | |
|---|---|---|---|
| 5,778,745 A * | 7/1998 | Furusawa | B23B 25/02 451/28 |
| 10,725,456 B2 * | 7/2020 | Bao | G05B 19/182 |
| 2017/0108846 A1 * | 4/2017 | Sannomiya | B23Q 17/12 |
| 2017/0304920 A1 | 10/2017 | Sannomiya et al. | |
| 2018/0050431 A1 * | 2/2018 | Kitakaze | B23B 27/22 |
| 2018/0243834 A1 * | 8/2018 | Sannomiya | B23Q 15/013 |
| 2018/0257192 A1 * | 9/2018 | Nakaya | G05B 19/4093 |
| 2018/0281090 A1 | 10/2018 | Watanabe et al. | |
| 2018/0335765 A1 * | 11/2018 | Tezuka | G05B 19/404 |
| 2020/0094327 A1 * | 3/2020 | Muramatsu | G05B 19/40937 |
| 2020/0101538 A1 * | 4/2020 | Kitakaze | B23B 7/00 |
| 2020/0338644 A1 * | 10/2020 | Takahashi | B23G 1/04 |
| 2021/0370455 A1 * | 12/2021 | Sannomiya | B23B 25/02 |
| 2021/0389747 A1 | 12/2021 | Noguchi et al. | |

(Continued)

FOREIGN PATENT DOCUMENTS

| | | | |
|---|---|---|---|
| EP | 3 892 405 | 10/2021 | |
| WO | WO-2020241524 A1 * | 12/2020 | B23B 1/00 |

OTHER PUBLICATIONS

International Search Report dated Jul. 3, 2023, issued in PCT counterpart application No. PCT/IL2023/050276.

(Continued)

*Primary Examiner* — Nicole N Ramos
(74) *Attorney, Agent, or Firm* — Womble Bond Dickinson (US) LLP

(57) ABSTRACT

A method for cutting a thread on a rotating workpiece by means of a cutting tool having a cutting edge. The method includes sequentially performing a number of passes, each pass includes simultaneously moving the cutting tool and/or the workpiece relative to each other along and oscillating the cutting tool towards and away from workpiece rotational such that the cutting edge exits and enters the workpiece forming an air cut. The air cuts performed in a final pass are longer than all the other passes.

27 Claims, 3 Drawing Sheets

(56) References Cited

U.S. PATENT DOCUMENTS

2022/0161339 A1    5/2022  Sannomiya
2023/0158592 A1*   5/2023  Nilsson .................... B23G 1/02
                                                      82/1.11

OTHER PUBLICATIONS

Written Opinion dated Jul. 3, 2023, issued in PCT counterpart application No. PCT/IL2023/050276.

* cited by examiner

METHOD FOR CUTTING A THREAD ON A ROTATING WORKPIECE

FIELD OF THE INVENTION

The subject matter of the present application relates to cutting tools of the type which perform turning metal cutting operations on a rotating workpiece, in particular to single-point threading metal cutting operations.

BACKGROUND OF THE INVENTION

As is known in the field of single-point threading, a cutting tool, having a cutting edge, performs a turning cutting operation on a (rotating) workpiece to form a thread, typically by using a CNC-lathe. To form the teeth (specifically the thread grooves) of the thread to the desired height, a set of passes are performed. During each pass, the cutting tool moves in a feed direction and the cutting edge cuts into the workpiece, producing chips. Optionally, during each pass, the cutting tool can also oscillate towards and away from the workpiece. By virtue of the oscillations, the cutting edge enters and exits the workpiece. During the period that the cutting edge exits the workpiece, and until it re-enters the workpiece, an air cut is performed. The air cut break the chips, beneficially preventing the chips from being overly long. Examples of such cutting tools are disclosed in, for example, EP 3892405, US 2018/281090 and US 2017/304920.

SUMMARY OF THE INVENTION

In accordance with a first aspect of the subject matter of the present application there is provided a method for cutting a thread on a workpiece having a workpiece rotational axis by means of a cutting tool comprising a cutting edge, the method comprising:
  rotating the workpiece about the workpiece rotational axis; and
  sequentially performing a total of N oscillating passes, where N is an integer greater or equal to three, m is a variable integer such that $1 \leq m \leq N$ and $P_m$ designates the $m^{th}$ oscillating pass, the N oscillating passes including an initial oscillating pass and a final oscillating pass, each pair of sequential oscillating passes, comprising a current oscillating pass and an immediately preceding oscillating pass associated therewith, each current oscillating pass sequentially following its immediately preceding oscillating pass; wherein:
  each oscillating pass comprises the steps of:
    moving the cutting tool and/or the workpiece relative to each other along a feed axis defining a feed direction; and
    applying an oscillation to the cutting tool in opposite vibration inward and outward directions towards and away from the workpiece rotational axis, respectively, such that:
      a trajectory of the cutting edge defines an oscillating trajectory contour with respect to a horizontal axis extending parallel to the feed axis and a vertical axis extending perpendicular to the feed axis, the oscillating trajectory contour having a cyclic waveform comprising a plurality of crests and a plurality of troughs, each crest comprising a furthest crest portion which is a furthest distance from the horizontal axis and spaced apart therefrom in a direction of the vertical axis by a crest distance and each trough comprising a closest trough portion which is a closest distance to the horizontal axis and spaced apart therefrom in a direction of the vertical axis by a trough distance; wherein:
      the oscillating trajectory contour of each current oscillating pass has a 180° phase shift from the oscillating trajectory contour of its immediately preceding oscillating pass;
      the oscillating trajectory contour of each current oscillating pass intersects the oscillating trajectory contour of its immediately preceding oscillating pass once in every one of the former's complete cycles to form a plurality of chip separation sections and a plurality of chip formation sections alternating with the plurality of chip separation sections in the feed direction, each chip separation section having a chip separation length and each chip formation section having a chip formation length, both measured in the direction of the horizontal axis; and
      the chip formation length of each chip formation section of a final pair of sequential oscillating passes is shorter than the chip formation length of each chip formation section of any other pair of sequential oscillating passes.

In accordance with a second aspect of the subject matter of the present application there is provided a method for cutting a thread on a workpiece having a workpiece rotational axis by means of a cutting tool comprising a cutting edge, the method comprising:
  rotating the workpiece about the workpiece rotational axis; and
  sequentially performing a total of N oscillating passes, where N is an integer greater or equal to three, m is a variable integer such that $1 \leq m \leq N$ and $P_m$ designates the $m^{th}$ oscillating pass, the N oscillating passes including an initial oscillating pass and a final oscillating pass, each pair of sequential oscillating passes, comprising a current oscillating pass and an immediately preceding oscillating pass associated therewith, each current oscillating pass sequentially following its immediately preceding oscillating pass; wherein:
  each oscillating pass comprises the steps of:
    moving the cutting tool and/or the workpiece relative to each other along a feed axis defining a feed direction; and
    applying an oscillation to the cutting tool in opposite vibration inward and outward directions towards and away from the workpiece rotational axis, respectively, such that:
      a trajectory of the cutting edge defines an oscillating trajectory contour with respect to a horizontal axis extending parallel to the feed axis and a vertical axis extending perpendicular to the feed axis, the oscillating trajectory contour having a cyclic waveform comprising a plurality of crests and a plurality of troughs, each crest comprising a furthest crest portion which is a furthest distance from the horizontal axis and spaced apart therefrom in a direction of the vertical axis by a crest distance and each trough comprising a closest trough portion which is a closest distance to the horizontal axis and spaced apart therefrom in a direction of the vertical axis by a trough distance; wherein:

the oscillating trajectory contour of each current oscillating pass has a 180° phase shift from the oscillating trajectory contour of its immediately preceding oscillating pass;

the crest distances of the oscillating trajectory contour of each current oscillating pass are greater than the trough distances of the oscillating trajectory contour of its immediately preceding oscillating pass;

the trough distances of the oscillating trajectory contour of each current oscillating pass are less than the crest distances of the oscillating trajectory contour of its immediately preceding oscillating pass;

the cyclic waveform of each oscillating trajectory contour has a constant wave frequency and constant wave amplitude, the wave frequency and wave amplitude being the same, respectively, for all the oscillating passes;

the oscillating trajectory contours of each pair of sequential same-parity oscillating passes are spaced apart by a pair gap in the direction of the vertical axis; and the pair gap between the oscillating trajectory contours of a final pair of sequential same-parity oscillating passes is less than a corresponding pair gap between the oscillating trajectory contours of all other pairs of sequential same-parity oscillating passes.

It is understood that the above-said is a summary, and that features described hereinafter may be applicable in any combination to the subject matter of the present application, for example, any of the following features may be applicable to the method:

The chip formation length of each chip formation section of the final pair of sequential oscillating passes can be equal to the chip separation length of each chip separation section of the final pair of sequential oscillating passes.

The cyclic waveform of each oscillating trajectory contour can have a constant wave frequency and constant wave amplitude. The wave frequency and wave amplitude can be the same, respectively, for all the oscillating passes.

The crest and trough distances of the oscillating trajectory contours of the final pair of sequential oscillating passes can be equal, respectively.

The crest and trough distances of the oscillating trajectory contour of each current even-parity oscillating pass that is not the final oscillating pass, can be less than the corresponding crest and trough distances of the oscillating trajectory contour of its immediately preceding odd-parity oscillating pass.

The crest and trough distances of the oscillating trajectory contour of each current odd-parity oscillating pass that is not the final oscillating pass, can be less than the corresponding crest and trough distances of the oscillating trajectory contour of its immediately preceding even-parity oscillating pass.

The crest and trough distances of the oscillating trajectory contour of each current odd parity oscillating pass that is not the final oscillating pass, can be equal to the corresponding crest and trough distances of the oscillating trajectory contour of its immediately preceding even-parity oscillating pass.

The step of moving the cutting tool and/or the workpiece relative to each other along the feed axis can comprise moving only the cutting tool.

The feed axis can be parallel to the workpiece rotational axis.

The cutting edge can exit the workpiece once in every one of the initial oscillating pass's complete cycles.

N can be an even number.

Each chip separation section is bounded by a chip separation section boundary that can comprise a portion of the crest of the oscillating trajectory contour of one of the current oscillating passes that is not the initial oscillating pass, and a portion of the trough of the oscillating trajectory contour of said one of the current oscillating passes' immediately preceding oscillating pass.

Said portion of the crest can contain the furthest crest portion and said portion of trough can contains the closest trough portion.

The furthest crest portion and the closet trough portion can both be points.

The cyclic waveform can be a triangle wave or a sine wave.

The cyclic waveform can be a triangle wave.

Each crest can exhibit mirror symmetry about a respective crest symmetry plane oriented perpendicular to the horizontal axis and intersecting the furthest crest portion. Each trough can exhibit mirror symmetry about a respective trough symmetry plane oriented perpendicular to the horizontal axis and intersecting the furthest trough portion.

N can equal six.

N can equal five.

The oscillating trajectory contours of each pair of sequential same-parity oscillating passes can be spaced apart by a pair gap in the direction of the vertical axis.

The pair gap between the oscillating trajectory contours of a final pair of sequential same-parity oscillating passes can be less than a corresponding pair gap between the oscillating trajectory contours of all other pairs of sequential same-parity oscillating passes.

The pair gap between the oscillating trajectory contours of all pairs of sequential same-parity oscillating passes can be the same.

The cutting tool can undergo one oscillation for each rotation of the workpiece.

The method can further comprise performing an initial straight pass and optionally performing a final straight pass, after performing N oscillating passes. Each straight pass can comprise moving the cutting tool and/or the workpiece relative to each other along the feed axis without oscillating the cutting tool towards and away from the workpiece rotational axis, such that the trajectory of the cutting edge traces a straight trajectory contour having a straight lineform.

The straight trajectory contour of the initial straight pass can intersect the oscillating trajectory contour of the final oscillating pass once in every one of the final oscillating pass's complete cycles.

The method can further comprise performing both the initial straight pass and the final straight pass. The straight trajectory contour of the final straight pass may not intersect the straight trajectory contour of the initial straight pass.

BRIEF DESCRIPTION OF THE FIGURES

For a better understanding of the present application and to show how the same may be carried out in practice, reference will now be made to the accompanying drawings, in which.

Figure 1:
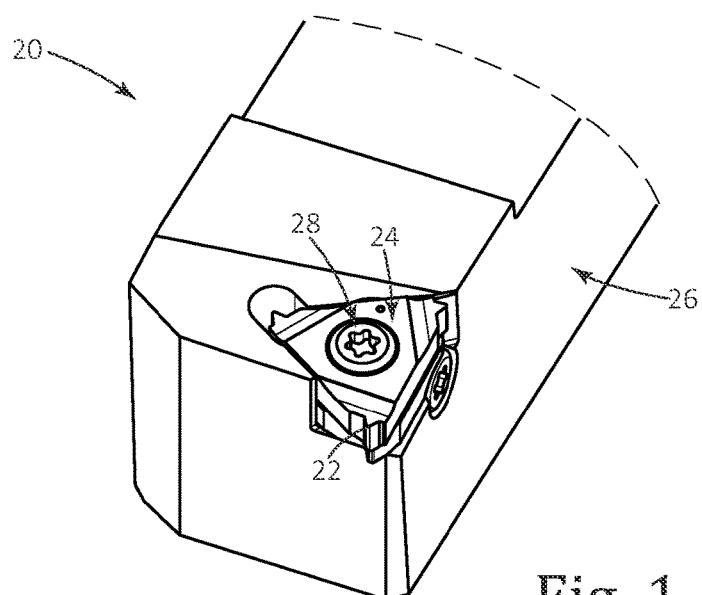
FIG. 1 is a perspective view of a cutting tool, showing a cutting edge.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Attention is first drawn to FIG. 1 showing a cutting tool 20, for chip removal, in accordance with embodiments of the subject matter of the present application. The cutting tool 20 includes a cutting edge 22. The cutting tool 20 is a single-point threading cutting tool designed to cut a thread in a rotating workpiece W. In this non-limiting example shown in the drawings, the cutting tool 20 has a cutting insert 24 which can be typically made from cemented carbide. The cutting edge 22 is formed on the cutting insert 24. The cutting tool 20 also has an insert holder 26 which can be typically made from steel. The cutting insert 24 is releasable attached to the insert holder 26 by means of a fastening member 28.

Figure 2:
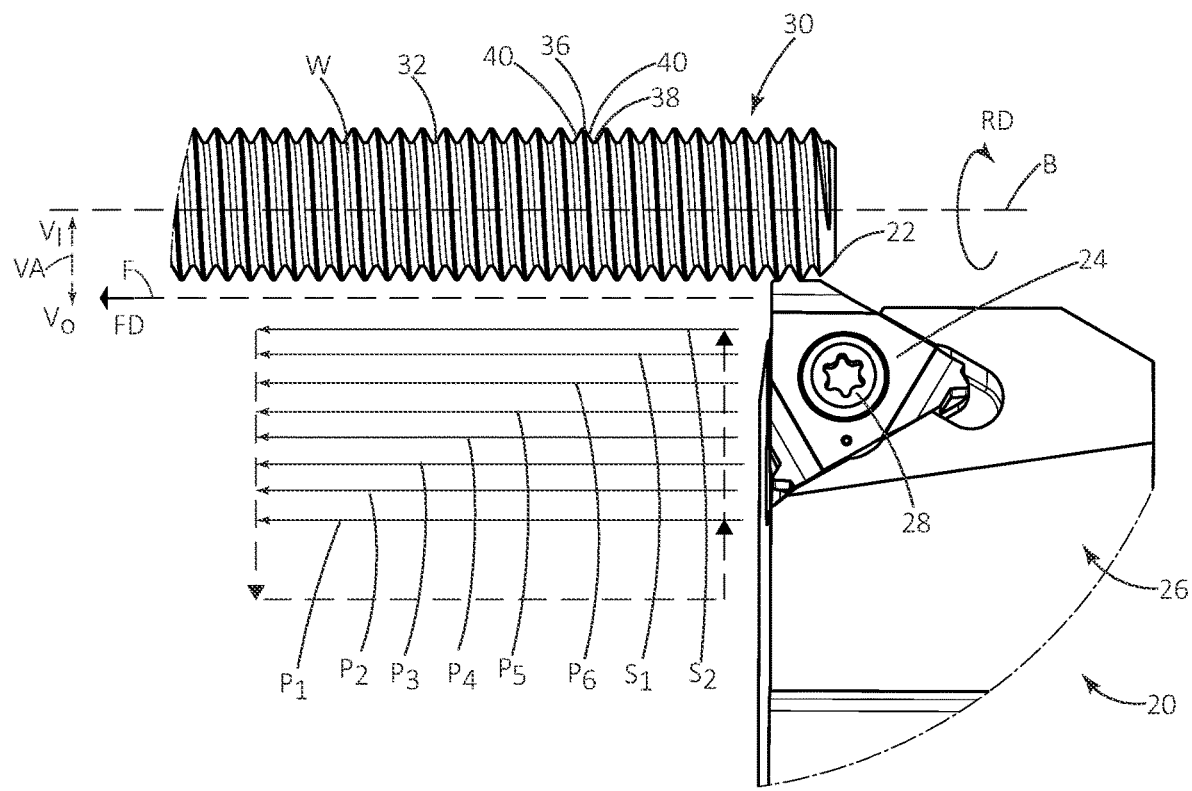
FIG. 2 is a side view of the cutting tool and a workpiece, showing a method for cutting a thread on a rotating workpiece, illustrating a number of oscillating passes.

Reference is next made to FIG. 2, showing the cutting tool 20 and the workpiece W. The workpiece W is connected to a spindle (not shown) which rotates the workpiece W about a workpiece rotational axis B in a workpiece rotational direction RD. The workpiece W includes a radially outward facing workpiece peripheral surface 34. Before cutting, the workpiece peripheral surface 34 is typically cylindrical (see FIG. 3). The thread 30 includes a workpiece threaded surface 32 which extends about the workpiece rotational axis B. The workpiece threaded surface 32 can be formed on the workpiece peripheral surface 34 of the workpiece W and thus the thread 30 being formed is an external thread. Alternatively, the workpiece threaded surface 32 can be formed by a radially inward facing wall surface formed in a recess of the workpiece W (not shown) and thus the thread 30 being formed is an internal thread. The workpiece threaded surface 32 includes a thread ridge 36 that extend helically about the workpiece rotational axis B. The thread 30 includes a thread groove 38 that extend helically about the workpiece rotational axis B. The thread ridge 38 is connected to the thread groove 38 by two opposite thread flanks 40.

Together, the spindle and the cutting tool 20 form part of a CNC-lathe (not shown). The CNC-lathe is controlled by a computer program. The computer program includes design instructions. The design instructions include information regarding relative movements of the cutting tool 20 in relation to the spindle (and the workpiece W) at least in the CNC-lathe's x-axis and the z-axis directions, and in relation to the rotation of the workpiece W about the workpiece rotational axis B.

A first aspect of the present application includes a method for cutting the thread on the workpiece W by means of the cutting tool 20. The method includes the step of rotating the workpiece W about the workpiece rotational axis B. Referring in particular to FIG. 2, the method further includes sequentially performing a total of N oscillating passes $P_m$ (m=1, 2, 3, . . . , N) where N is an integer greater or equal to three, m is an variable integer and $1 \leq m \leq N$, and $P_m$ represents the $m^{th}$ oscillating pass. Hereinafter, the expression "$P_m$" by itself, may be used to refer to a single, or all, the oscillating passes, depending on the context. The total number N of oscillating passes $P_m$ includes an initial oscillating pass $P_1$, which is the first oscillating pass (i.e., m=1) and a final oscillating pass $P_N$, which is the last oscillating pass (i.e., m=N). Each oscillating pass $P_m$ either has odd-parity (i.e., m is an odd integer) or has even-parity (i.e., m is an even integer). It is noted that the terms odd-parity and even-parity are equivalent to, and interchangeable with, the terms odd-numbered and even-numbered, respectively. During each oscillating pass $P_m$, a cutting operation is performed on the work piece.

For m=2, 3, . . . , N, each pair of sequential oscillating passes includes a current oscillating pass $P_m$ and an immediately preceding oscillating pass $P_{m-1}$. Each current oscillating pass $P_m$ sequentially follows its immediately preceding oscillating pass $P_{m-1}$. Thus, for m=2, 3, . . . , N, any current oscillating pass $P_m$ which is the $m^{th}$ oscillating pass, has an immediately preceding oscillating pass $P_{m-1}$ which is the $(m-1)^{th}$ oscillating pass. Also for m=2, 3, . . . , N, an immediately preceding oscillating pass $P_{m-1}$ which is the $(m-1)^{th}$ oscillating pass, has a current oscillating pass $P_m$ which is the $m^{th}$ oscillating pass. In an analogous manner, for m=1, 2, . . . , N-1, any current oscillating pass $P_m$ has a subsequent oscillating pass $P_{m+1}$. It should be clear from the foregoing that the members of each pair of sequential oscillating passes $P_m$, $P_{m+1}$ have different parity.

Figure 4A:
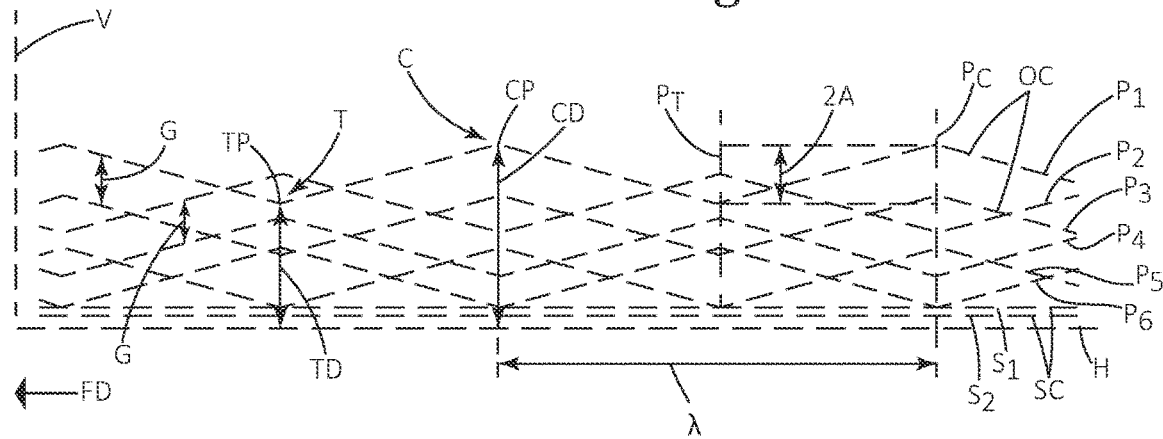
FIG. 4A is a schematic diagram illustrating oscillating trajectory contours for the number of oscillating passes and straight trajectory contours for two straight passes, in accordance with a first embodiment of the present invention.
Figure 4B:
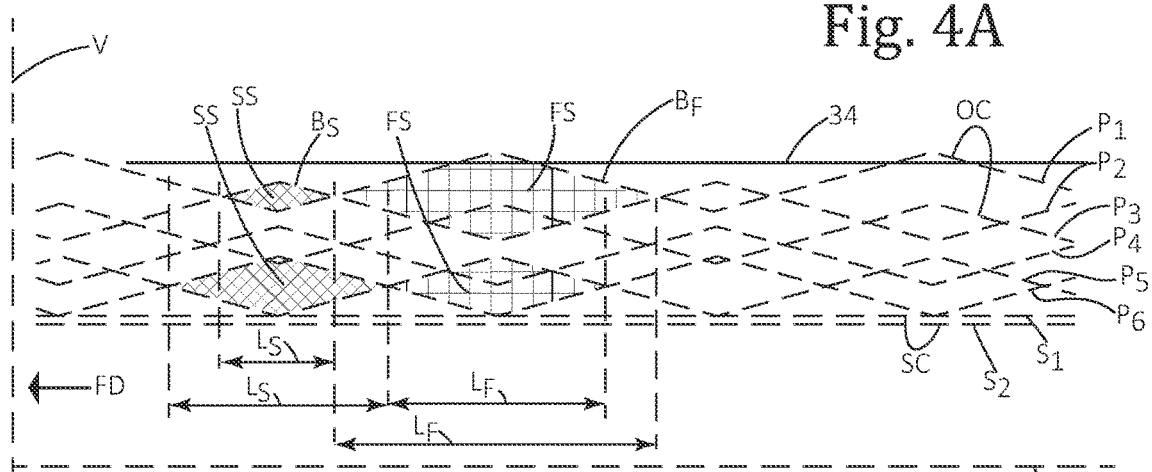
FIG. 4B is the same schematic diagram as FIG. 4A, showing two chip separation sections and two chip formation sections.

In accordance with some embodiments of the subject matter of the present application, the total number of passes N can be an even number. Referring to FIGS. 4A and 4B, showing a first embodiment of the subject matter of the present application, the number N can equal six (i.e., N=6).

Figure 5:
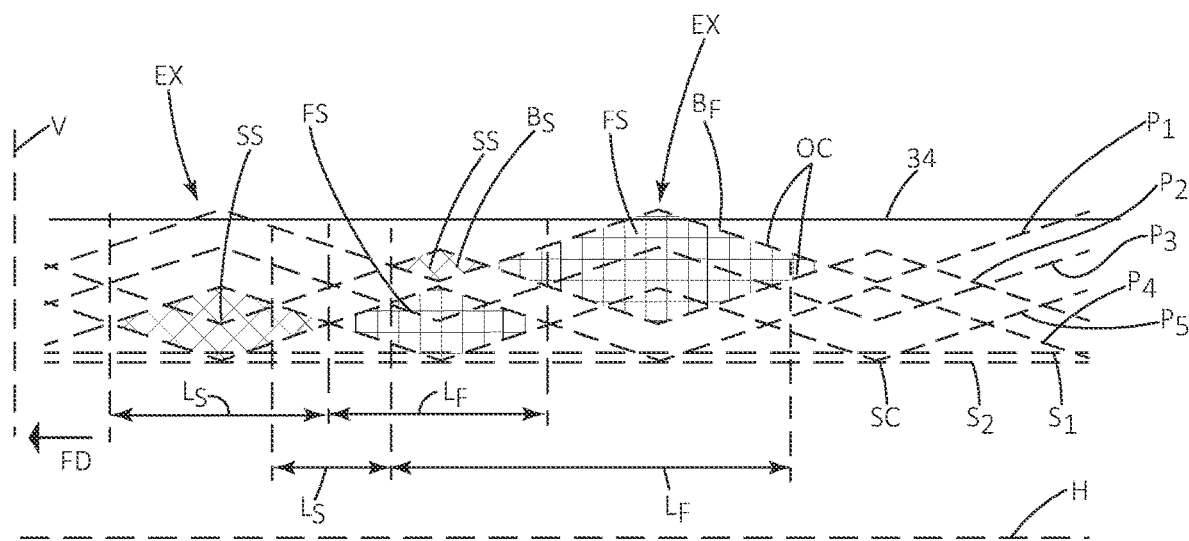
FIG. 5 is a schematic diagram illustrating oscillating trajectory contours for the number of oscillating passes and straight trajectory contours for two straight passes, in accordance with a second embodiment of the present invention.

Alternatively, in accordance with some other embodiments of the subject matter of the present application, the total number of passes N can be an odd number. Referring to FIG. 5, showing a second embodiment of the subject matter of the present application, the number N can equal five (i.e., N=5).

Figure 3:
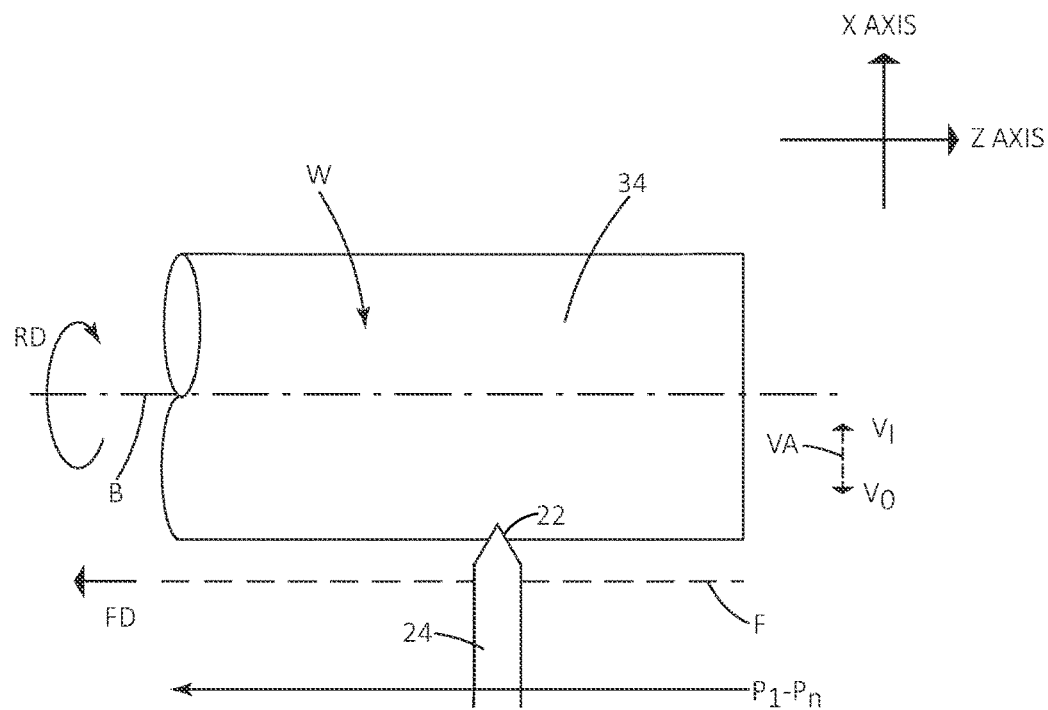
FIG. 3 is a schematic diagram of the cutting tool and the workpiece, illustrating the orientation thereof with respect to an x-axis and a z-axis of a CNC-lathe.

Referring to FIG. 3, each oscillating pass $P_m$ includes the step of moving the cutting tool 20 and/or the workpiece W relative to each other along a feed axis F. Preferably, the step of moving the cutting tool 20 and/or the workpiece W relative to each other along the feed axis F includes moving only the cutting tool 20. The feed axis F defines a feed direction FD. In accordance with some embodiments of the subject matter of the present application, the feed axis F can be parallel to the workpiece rotational axis B. Thus, the thread 30 being formed is a straight thread. It is noted however, that the feed axis F can be non-parallel to the workpiece rotational axis B, in which case the thread 30 being formed is a tapered (conic) thread.

Each oscillating pass $P_m$ also includes the step of applying an oscillation (vibration) to the cutting tool 20 in opposite vibration inward and outward directions $V_I$, $V_O$ along a vibration axis VA, towards and away from the workpiece rotational axis B, respectively. The vibration inward and outward directions $V_I$, $V_O$ can be radial directions (with respect to the workpiece rotation axis B). The step of applying the oscillation to the cutting tool 20 is performed during (i.e., simultaneously with) the step of moving the cutting tool 20 and/or the workpiece W relative to each other. In accordance with some embodiments of the subject matter of the present application, during each oscillating pass $P_m$, the cutting tool 20 undergoes one oscillation for each rotation of the workpiece W.

Referring now to FIG. 4A, during each of the oscillating passes $P_m$, a trajectory of the cutting edge 22 defines an oscillating trajectory contour OC with respect to horizontal and vertical axes H, V. The vertical axis V represents the position of the cutting edge 22 from the workpiece rotational axis B (i.e., the radial distance of the cutting edge 22 from the workpiece rotational axis B). The horizontal axis H represents the position of the cutting edge 22 along the feed axis F (in the feed direction FD). Alternatively, the horizontal axis H can be understood as time. In the configuration where the feed axis F is parallel to the workpiece rotational axis B, the vertical axis V is equivalent to the x-axis of the CNC-lathe and the horizontal axis H is equivalent to the z-axis of the CNC-lathe.

By virtue of the two foregoing steps (that is, the step of moving the cutting tool 20 and/or the workpiece W relative to each other and the step of applying an oscillation to the cutting tool 20), the oscillating trajectory contour OC has a cyclic waveform. Each oscillating trajectory contour OC extends in the feed direction FD.

In accordance with some embodiments of the subject matter of the present application, the cyclic waveform of each oscillating trajectory contour OC can have a constant wave amplitude A. The wave amplitude A can be the same for all the oscillating passes $P_m$. A constant wave amplitude A for all the oscillating passes implies that the incremental depth of cut (in the x-axis direction) is the same for each of these passes.

The cyclic waveform of each oscillating trajectory contour OC can have a constant wave period λ(wavelength). The wave period can be the same for all the oscillating passes $P_m$. Thus, assuming a constant feed rate for each pass, the cyclic waveform of each oscillating trajectory contour OC can have a constant wave frequency. The wave frequency can be the same for all the oscillating passes $P_m$. A constant wave period and λ constant wave frequency for all the oscillating passes implies that the feed rate (in the feed direction FD) is constant across all the passes.

The cyclic waveform includes a plurality of crests C and a plurality of troughs T. The plurality of crests C and a plurality of troughs T alternate with each other in the feed direction FD. Each crest C includes a furthest crest portion CP which is a furthest distance from the horizontal axis H and spaced apart therefrom in a direction of the vertical axis V by a crest distance CD. Each trough T includes a closest trough portion TP which is a closest distance to the horizontal axis H and spaced apart therefrom in a direction of the vertical axis V by a trough distance TD. In accordance with some embodiments of the subject matter of the present application, the furthest crest portion CP and the closet trough portion TP can both be points. The cyclic waveform can be a triangle wave or a sine wave. Preferably, the cyclic waveform is a triangle wave. Each crest C can exhibit mirror symmetry about a respective crest symmetry plane $P_c$ oriented perpendicular to the horizontal axis H and intersecting the furthest crest portion CP. Each trough T can exhibit mirror symmetry about a respective trough symmetry plane $P_T$ oriented perpendicular to the horizontal axis H and intersecting the closest trough portion TP.

The oscillating trajectory contour OC of each current oscillating pass $P_m$ has a 180° phase shift from the oscillating trajectory contour OC of its immediately preceding oscillating pass $P_{m-1}$. Thus, the oscillating trajectory contours OC of all same-parity oscillating passes $P_m$ have the same phase, and the phases alternate from one pass to the next.

In accordance with some embodiments of the subject matter of the present application, the crest and trough distances CD, TD of the oscillating trajectory contour OC of the final pair of sequential oscillating passes $P_{N-1}$, $P_N$ can be equal, respectively. That is to say, the crest distances CD of the oscillating trajectory contour OC of the final pair of sequential oscillating passes $P_{N-1}$, $P_N$ can be equal and trough distances TD of the oscillating trajectory contour OC of the final pair of sequential oscillating passes $P_{N-1}$, $P_N$ can be equal.

The crest and trough distances CD, TD of the oscillating trajectory contour OC of each current oscillating pass $P_m$ that is an even-parity oscillating pass (m=2, 4, 6, etc.), and that is not the final oscillating pass $P_N$, can be less than the crest and trough distances CD, TD of the oscillating trajectory contour OC of its respective immediately preceding (odd-numbered) oscillating pass $P_{m-1}$.

In accordance with the first embodiment of the subject matter of the present application, the crest and trough distances CD, TD of the oscillating trajectory contour OC of each current oscillating pass $P_m$ that is an odd-parity oscillating pass greater than 1 (m=3, 5, 7, etc.), and that is not the final oscillating pass $P_N$, can be less than the crest and trough distances CD, TD of the oscillating trajectory contour OC of its respective immediately preceding (even-numbered) oscillating pass $P_{m-1}$.

In accordance with the second embodiment of the subject matter of the present application, the crest and trough distances CD, TD of the oscillating trajectory contour OC of each current oscillating pass $P_m$ that is an odd-parity oscillating pass greater than 1 (m=3, 5, 7, etc.), and that is not the final oscillating pass $P_N$, can be equal to the crest and trough distances CD, TD of the oscillating trajectory contour OC of its respective immediately preceding (even-numbered) oscillating pass $P_{m-1}$.

The oscillating trajectory contours OC of each pair of sequential same-parity oscillating passes $P_m$, $P_{m+2}$ (for m=1, 2, . . . , N−2) are spaced apart in the direction of the vertical axis V by a pair gap G. In accordance with the first embodiment of the subject matter of the present application, the pair gap G between the oscillating trajectory contours OC of a final pair of sequential same-parity oscillating passes $P_{N-2}$, $P_N$ can be less than a corresponding pair gap G between the oscillating trajectory contours OC of all other (earlier) pairs of sequential same-parity oscillating passes $P_m$, $P_{m+2}$ (for m=1, 2, . . . , N−3). Alternatively, in accordance with the second embodiment of the subject matter of the present application, the pair gap G between the oscillating trajectory contours OC of all the pairs of sequential same-parity oscillating passes $P_m$, $P_{m+2}$ (for m=1, 2, . . . , N−2) can be the same.

Referring again to FIGS. 4B and 5, In accordance with some embodiments of the subject matter of the present application, the crest distances CD of the oscillating trajectory contour OC of each current oscillating pass $P_m$ (for m=2, 3, 4, etc.) can be greater than the trough distances TD of the oscillating trajectory contour OC of its immediately preceding oscillating pass $P_{m-1}$ (for m=1, 2, 3, etc.). Moreover, the trough distances TD of the oscillating trajectory contour OC of each current oscillating pass $P_m$ (m=2, 3, 4, etc.) can be less than the crest distances CD of the oscillating trajectory contour OC of its immediately preceding oscillating pass $P_{m-1}$ (for m=1, 2, 3, etc.).

The oscillating trajectory contour OC of its immediately preceding oscillating pass $P_{m-1}$, the oscillating trajectory contour OC of each current oscillating pass $P_m$ (for m=2, 3, . . . , N) intersects the oscillating trajectory contour OC of its immediately preceding oscillating pass $P_{m-1}$ once in every one of the former's complete cycles to form a plurality of chip separation sections SS and a plurality of chip formation sections FS. The plurality of chip separation sections SS and the plurality of chip formation sections FS alternate with other in the feed direction FD. As a way of illustration, two chip separation sections SS are shown with diagonal hatching and two chip formation sections FS are shown with vertical and horizontal hatching. It is noted that a) the 180° phase shift, b) the crest distances CD being greater than the trough distances TD, and c) the trough distances TD being less than the crest distances CD, with respect to the oscillating trajectory contours OC of any current oscillating pass $P_m$ (for m=2, 3, . . . , N) and its immediately preceding oscillating pass $P_{m-1}$ (i.e. the configuration in accordance with the first embodiment) allows the current oscillating trajectory contours $P_m$ and its immediately preceding oscillating pass $P_{m-1}$ to intersect as described above.

Each chip separation section SS is bounded (i.e., delimited) by a chip separation section boundary $B_S$. As seen in FIGS. 4B and 5, the chip separation section boundary $B_S$ is formed from a portion of the oscillating trajectory contour OC of one of the current oscillating pass $P_m$ that is not the initial oscillating pass ($P_1$) (i.e. for m=2, 3, . . . , N) and a portion of the oscillating trajectory contour OC of its respective immediately preceding oscillating pass $P_{m-1}$ (underlying therefrom). Each chip separation section SS represents an air cut (that is to say, the cutting edge 22 is disengaged from the workpiece and the cutting operation is an interrupted cut). During the air cut the chip breaks (i.e., separates from the workpiece). Each chip separation section SS has a chip separation length $L_S$, as measured in the direction of the horizontal axis H (i.e., along the feed axis F). In accordance with some embodiments of the subject matter of the present application, the chip separation section boundary $B_S$ can include a portion of the crest C of the oscillating trajectory contour OC of one of the current oscillating passes $P_m$ that is not the initial oscillating pass ($P_1$) (i.e. for m=2, 3, . . . , N) and a portion of the trough T of the oscillating trajectory contour OC of its respective immediately preceding oscillating pass $P_{m-1}$. Preferably, said portion of the crest C can contain the furthest crest portion CP and said portion of the trough T can contain the closest trough portion TP.

Referring to FIGS. 4A-5, in accordance with some embodiments of the subject matter of the present application, the cutting edge 22 can exit the workpiece W (e.g., the workpiece threaded surface 32 and be radially outward of the workpiece peripheral surface 34 as indicated by the trajectory protrusions EX in FIG. 5) once in every one of the initial oscillating pass's $P_1$ complete cycles.

Each chip formation section FS is bounded (i.e., delimited) by a chip formation section boundary $B_F$. As seen in FIGS. 4B and 5, the chip formation section boundary $B_F$ is formed from a portion of the oscillating trajectory contour OC of each current oscillating pass $P_m$ (for m=2, 3, . . . , N) and a portion of the oscillating trajectory contour OC of its respective immediately preceding oscillating pass $P_{m-1}$ (overlying therefrom). Each chip formation section FS represents a "cut" (that is to say, the cutting edge 22 is engaged with the workpiece). During the "cut" the chip is formed from a removed portion of the workpiece. Each chip formation section FS has a chip formation length $L_F$, as measured in the direction of the horizontal axis H (i.e., along the feed axis F). The chip formation section boundary $B_F$ can include a portion of the oscillating trajectory contour OC of one of the troughs T of the current oscillating pass $P_m$ (m=2, 3, . . . , N) and a portion of the crest C of the oscillating trajectory contour OC of its respective immediately preceding oscillating pass $P_{m-1}$.

For methods for cutting a thread on a rotating workpiece in accordance with the first and second embodiments of the subject matter of the present application, the chip formation length $L_F$ of each chip formation section FS of a final pair of sequential oscillating passes $P_{N-1}$, $P_N$ is shorter than the chip formation length $L_F$ of each chip formation section FS of any other previous pair of sequential oscillating passes $P_{m-1}$, $P_m$ (m=2, 3, . . . , N−1). Thus, the chips are shorter in the final oscillating pass $P_N$ than the preceding oscillating pass $P_{N-1}$. This is advantageous for chip evacuation when cutting the root of a thread (i.e., when performing the final oscillating pass) since the thread flanks 40 in the thread groove 38 restrict evacuation of chips. In accordance with some embodiments of the subject matter of the present application, the chip formation length $L_F$ of each chip formation section FS of the final pair of sequential oscillating passes $P_{N-1}$, $P_N$ can be equal to than the chip separation length $L_S$ of each chip separation section SS of the final pair of sequential oscillating passes $P_{N-1}$, $P_N$.

Figure 6:
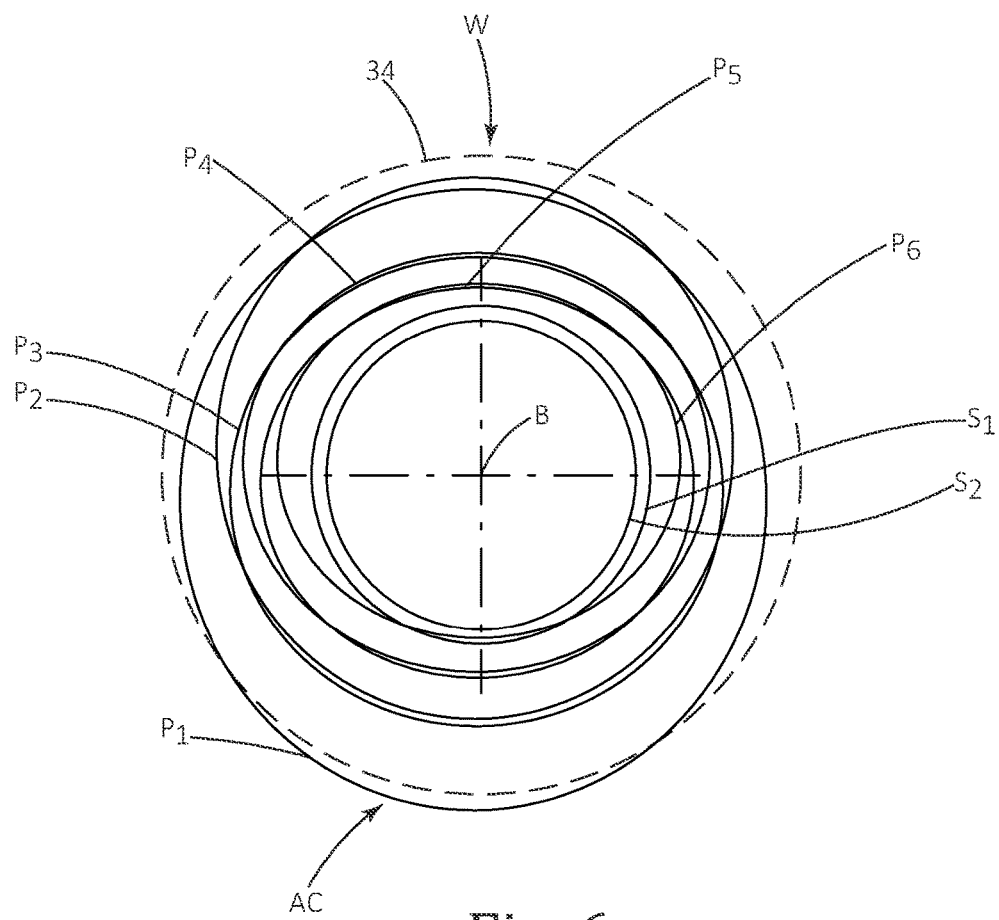
FIG. 6 is a schematic diagram illustrating trajectories of the cutting edge, for the number of oscillating passes, in one thread on the workpiece as seen in a direction along a workpiece rotational axis, in accordance with the first embodiment of the invention.

In accordance with the first embodiment of the subject matter of the present application, FIG. 6 is a schematic diagram illustrating the trajectories traced by the cutting edge 22 in one thread illustrated in FIGS. 4A and 4B as seen in the z-axis direction of the workpiece W. As illustrated in FIG. 6, because the cutting operation illustrated in FIGS. 4A and 4B is adapted such that the number of vibrations of the cutting edge 22 is one with respect to one rotation of the spindle, the workpiece W has an oval shape when observed in the direction of the workpiece rotational axis B, and one air cut AC occurs with respect to the perimeter of the workpiece W (one rotation of the workpiece W).

Reverting to FIG. 4A, in accordance with some embodiments of the subject matter of the present application, the method can further include the step of performing one or two straight passes $S_1$, $S_2$, after performing the total number N of oscillating passes $P_m$ (m=1, 2, 3, ..., N). When two straight passes are made, there may be an initial straight pass $S_1$ which is the first straight pass and a final straight pass $S_2$, which is the second straight pass. In the configuration with only one straight pass $S_1$, the one straight pass $S_1$ is both the initial straight pass $S_1$ and the final initial straight pass $S_1$. Preferably, two straight passes $S_1$, $S_2$ are performed.

In accordance with some embodiments of the subject matter of the present application, each straight pass $S_1$, $S_2$ can include the step moving the cutting tool 20 and/or the workpiece W relative to each other along the feed axis F without performing the step of oscillating the cutting tool 20 towards and away from the workpiece rotational axis B, such that the trajectory of the cutting edge 22 traces a straight trajectory contour SC having a straight line-form.

In accordance with some embodiments of the subject matter of the present application, the straight trajectory contour SC of the initial straight pass $S_1$ can intersect the oscillating trajectory contour OC of the final oscillating pass $P_N$ once in every one of the latter's complete 360° cycles. In the configuration with two straight passes $S_1$, $S_2$, the straight trajectory contour SC of the final straight pass $S_2$ may not intersect the straight trajectory contour SC of the initial straight pass $S_1$. In some embodiments, the two straight passes $S_1$, $S_2$ may be parallel to each other, with the second straight pass $S_2$ being nearer to the workpiece rotational axis B.

Referring to FIG. 6, the trajectory of the cutting edge 22 of the straight passes $S_1$, $S_2$ are circular.

Although the subject matter of the present application has been described to a certain degree of particularity, it should be understood that various alterations and modifications could be made without departing from the spirit or scope of the invention as hereinafter claimed.

What is claimed is:

1. A method for cutting a thread on a workpiece (W) having a workpiece rotational axis (B) by means of a cutting tool (20) comprising a cutting edge (22), the method comprising:
rotating the workpiece (W) about the workpiece rotational axis (B); and
sequentially performing a total of N oscillating passes ($P_m$), where N is an integer greater or equal to three, m is a variable integer such that $1 \leq m \leq N$ and $P_m$ designates the $m^{th}$ oscillating pass, the N oscillating passes including an initial oscillating pass ($P_1$) and a final oscillating pass ($P_N$), each pair of sequential oscillating passes ($P_{m-1}$, $P_m$, for m=2, 3, ... N), comprising a current oscillating pass ($P_m$) and an immediately preceding oscillating pass ($P_{m-1}$) associated therewith, each current oscillating pass ($P_m$) sequentially following its immediately preceding oscillating pass ($P_{m-1}$); wherein:
each oscillating pass ($P_m$) comprises the steps of:
moving the cutting tool (20) and/or the workpiece (W) relative to each other along a feed axis (F) defining a feed direction (FD); and
applying an oscillation to the cutting tool (20) in opposite vibration inward and outward directions ($V_O$, $V_I$) towards and away from the workpiece rotational axis (B), respectively, such that:
a trajectory of the cutting edge (22) defines an oscillating trajectory contour (OC) with respect to a horizontal axis (H) extending parallel to the feed axis (F) and a vertical axis (V) extending perpendicular to the feed axis (F), the oscillating trajectory contour (OC) having a cyclic waveform comprising a plurality of crests (C) and a plurality of troughs (T), each crest (C) comprising a furthest crest portion (CP) which is a furthest distance from the horizontal axis (H) and spaced apart therefrom in a direction of the vertical axis (V) by a crest distance (CD) and each trough (T) comprising a closest trough portion (TP) which is a closest distance to the horizontal axis (H) and spaced apart therefrom in a direction of the vertical axis (V) by a trough distance (TD); wherein:
the oscillating trajectory contour (OC) of each current oscillating pass ($P_m$, m=2, 3, ..., N) has a 180° phase shift from the oscillating trajectory contour (OC) of its immediately preceding oscillating pass ($P_{m-1}$);
the oscillating trajectory contour (OC) of each current oscillating pass ($P_m$, m=2, 3, ..., N) intersects the oscillating trajectory contour (OC) of its immediately preceding oscillating pass ($P_{m-1}$) once in every one of the former's complete cycles to form a plurality of chip separation sections (SS) and a plurality of chip formation sections (FS) alternating with the plurality of chip separation sections (SS) in the feed direction (FD), each chip separation section (SS) having a chip separation length ($L_S$) and each chip formation section (FS) having a chip formation length ($L_F$), both measured in the direction of the horizontal axis (H); and
the chip formation length ($L_F$) of each chip formation section (FS) of a final pair of sequential oscillating passes ($P_{N-1}$, $P_N$) is shorter than the chip formation length ($L_F$) of each chip formation section (FS) of any other pair of sequential oscillating passes ($P_{m-1}$, $P_m$, m=2, 3, ..., N−1).

2. The method according to claim 1, wherein the chip formation length ($L_F$) of each chip formation section (FS) of the final pair of sequential oscillating passes ($P_{N-1}$, $P_N$) is equal to the chip separation length ($L_S$) of each chip separation section (SS) of the final pair of sequential oscillating passes ($P_{N-1}$, $P_N$).

3. The method according to claim 1, wherein the cyclic waveform of each oscillating trajectory contour (OC) has a constant wave frequency and constant wave amplitude (A), the wave frequency and wave amplitude (A) being the same, respectively, for all the oscillating passes ($P_m$).

4. The method according to claim 1, wherein the crest and trough distances (CD, TD) of the oscillating trajectory contours (OC) of the final pair of sequential oscillating passes ($P_{N-1}$, $P_N$) are equal, respectively.

5. The method according to claim 4, wherein the crest and trough distances (CD, TD) of the oscillating trajectory contour (OC) of each current even-parity oscillating pass ($P_m$, m=2, 4, 6, etc.) that is not the final oscillating pass ($P_N$), are less than the corresponding crest and trough distances (CD, TD) of the oscillating trajectory contour (OC) of its immediately preceding odd-parity oscillating pass ($P_{m-1}$, m=1, 3, 5, etc.).

6. The method according to claim 5, wherein the crest and trough distances (CD, TD) of the oscillating trajectory contour (OC) of each current odd-parity oscillating pass ($P_m$, m=3, 5, 7, etc.) that is not the final oscillating pass ($P_N$), are less than the corresponding crest and trough distances (CD, TD) of the oscillating trajectory contour (OC) of its immediately preceding even-parity oscillating pass ($P_{m-1}$, m=2, 4, 6, etc.).

7. The method according to claim 5, wherein the crest and trough distances (CD, TD) of the oscillating trajectory contour (OC) of each current odd parity oscillating pass ($P_m$, m=3, 5, 7, etc.) that is not the final oscillating pass ($P_N$), are equal to the corresponding crest and trough distances (CD, TD) of the oscillating trajectory contour (OC) of its immediately preceding even-parity oscillating pass ($P_{m-1}$, m=2, 4, 6, etc.).

8. The method, according to claim 1, wherein the step of moving the cutting tool (20) and/or the workpiece (W) relative to each other along the feed axis (F) comprises moving only the cutting tool (20).

9. The method, according to claim 1, wherein the feed axis (F) is parallel to the workpiece rotational axis (B).

10. The method, according to claim 1, wherein the cutting edge (22) exits the workpiece (W) once in every one of the initial oscillating pass's ($P_1$) complete cycles.

11. The method, according to claim 1, wherein N is an even number.

12. The method, according to claim 1, wherein:
each chip separation section (SS) is bounded by a chip separation section boundary ($B_S$) comprising:
a portion of the crest (C) of the oscillating trajectory contour (OC) of one of the current oscillating passes ($P_m$) that is not the initial oscillating pass ($P_1$), and
a portion of the trough (T) of the oscillating trajectory contour (OC) of said one of the current oscillating passes' immediately preceding oscillating pass ($P_{m-1}$).

13. The method, according to claim 12, wherein said portion of the crest (C) contains the furthest crest portion (CP) and said portion of trough (T) contains the closest trough portion (TP).

14. The method, according to claim 1, wherein the furthest crest portion (CP) and the closet trough portion (TP) are both points.

15. The method, according to claim 1, wherein the cyclic waveform is a triangle wave or a sine wave.

16. The method, according to claim 15, wherein the cyclic waveform is a triangle wave.

17. The method, according to claim 1, wherein:
each crest (C) exhibits mirror symmetry about a respective crest symmetry plane ($P_C$) oriented perpendicular to the horizontal axis (H) and intersecting the furthest crest portion (CP); and
each trough (T) exhibits mirror symmetry about a respective trough symmetry plane ($P_T$) oriented perpendicular to the horizontal axis (H) and intersecting the furthest trough portion (TP).

18. The method, according to claim 1, wherein N equals six.

19. The method, according to claim 1, wherein N equals five.

20. The method, according to claim 1, wherein the oscillating trajectory contours (OC) of each pair of sequential same-parity oscillating passes ($P_m$, $P_{m+2}$, m=1, 2, ..., N-2) are spaced apart by a pair gap (G) in the direction of the vertical axis (V).

21. The method, according to claim 20, wherein the pair gap (G) between the oscillating trajectory contours (OC) of a final pair of sequential same-parity oscillating passes ($P_{N-2}$, $P_N$) is less than a corresponding pair gap (G) between the oscillating trajectory contours (OC) of all other pairs of sequential same-parity oscillating passes ($P_m$, $P_{m+2}$, m=1, 2, ..., N-3).

22. The method, according to claim 20, wherein the pair gap (G) between the oscillating trajectory contours (OC) of all pairs of sequential same-parity oscillating passes ($P_m$, $P_{m+2}$, m=1, 2, ..., N-2) are the same.

23. The method, according to claim 1, wherein during each oscillating pass ($P_m$), the cutting tool (20) undergoes one oscillation for each rotation of the workpiece (W).

24. The method, according to claim 1, further comprising:
performing an initial straight pass ($S_1$) wherein:
the straight pass ($S_1$) comprises moving the cutting tool (20) and/or the workpiece (W) relative to each other along the feed axis (F) without oscillating the cutting tool (20) towards and away from the workpiece rotational axis (B), such that the trajectory of the cutting edge (22) traces a straight trajectory contour (SC) having a straight line-form.

25. The method, according to claim 24, wherein the straight trajectory contour (SC) of the initial straight pass ($S_1$) intersects the oscillating trajectory contour (OC) of the final oscillating pass ($P_N$) once in every one of the final oscillating pass's ($P_N$) complete cycles.

26. The method, according to claim 24, further comprising performing a final straight pass (S2), after performing N oscillating passes (Pm), wherein:
each straight pass ($S_2$) comprises moving the cutting tool (20) and/or the workpiece (W) relative to each other along the feed axis (F) without oscillating the cutting tool (20) towards and away from the workpiece rotational axis (B), such that the trajectory of the cutting edge (22) traces a straight trajectory contour (SC) having a straight line-form.

27. The method, according to claim 26, comprising:
performing both the initial straight pass ($S_1$) and the final straight pass ($S_2$), wherein:
the straight trajectory contour (SC) of the final straight pass ($S_2$) does not intersect the straight trajectory contour (SC) of the initial straight pass ($S_1$).

* * * * *